United States Patent
Gorai et al.

(10) Patent No.: US 12,332,107 B2
(45) Date of Patent: Jun. 17, 2025

(54) PHYSICAL QUANTITY DETECTION DEVICE

(71) Applicant: Hitachi Astemo, Ltd., Hitachinaka (JP)

(72) Inventors: Nobuaki Gorai, Hitachinaka (JP); Akira Uenodan, Hitachinaka (JP); Naoki Saito, Hitachinaka (JP); Takahiro Miki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 218 days.

(21) Appl. No.: 18/034,319

(22) PCT Filed: Sep. 8, 2021

(86) PCT No.: PCT/JP2021/032927
§ 371 (c)(1),
(2) Date: Apr. 27, 2023

(87) PCT Pub. No.: WO2022/107426
PCT Pub. Date: May 27, 2022

(65) Prior Publication Data
US 2023/0408316 A1    Dec. 21, 2023

(30) Foreign Application Priority Data
Nov. 20, 2020    (JP) .................... 2020-193614

(51) Int. Cl.
*G01F 5/00*    (2006.01)
*G01F 1/684*    (2006.01)

(52) U.S. Cl.
CPC .............. *G01F 5/00* (2013.01); *G01F 1/6842* (2013.01); *G01F 1/6845* (2013.01)

(58) Field of Classification Search
CPC . G01F 1/68–699; G01F 5/00; F02M 35/1038; F02M 35/10386
See application file for complete search history.

(56) References Cited

U.S. PATENT DOCUMENTS 8,763,452 B2 * 7/2014 Doi ..................... G01F 1/6842
                                                           73/204.11
2012/0055245 A1    3/2012 Doi et al.
(Continued)

FOREIGN PATENT DOCUMENTS

JP    2012-52975 A    3/2012
JP    2017-181521 A    10/2017
(Continued)

OTHER PUBLICATIONS

International Search Report (PCT/ISA/210) issued in PCT Application No. PCT/JP2021/032927 dated Oct. 12, 2021 with English translation (four (4) pages).
(Continued)

*Primary Examiner* — Justin N Olamit
(74) *Attorney, Agent, or Firm* — Crowell & Moring LLP

(57) ABSTRACT

An object of the present invention is to provide a physical quantity detection device configured to reduce an influence of a resonance phenomenon of sound pressure on flow rate characteristics. The physical quantity detection device according to the present invention includes: a housing arranged in the main passage; a sub-passage arranged in the housing; a flow rate detection unit arranged in the sub-passage; a circuit unit electrically connected to the flow rate detection unit; a circuit chamber arranged in the housing and accommodating the circuit unit; and a first introduction passage including one end open to the sub-passage and the other end open to the circuit chamber to communicate between the sub-passage and the circuit chamber. The flow rate detection unit includes a diaphragm including a diaphragm front surface exposed to the sub-passage and a diaphragm rear surface exposed to a closed chamber that communicates with the circuit chamber, and the circuit chamber includes at least one or more protrusions arranged
(Continued)

opposite an opening to which the other end of the first introduction passage is open.

9 Claims, 13 Drawing Sheets

(56) References Cited

U.S. PATENT DOCUMENTS

| | | |
|---|---|---|
| 2020/0158546 A1 | 5/2020 | Rittmann |
| 2020/0263623 A1 | 8/2020 | Plogmann et al. |

FOREIGN PATENT DOCUMENTS

| | | |
|---|---|---|
| JP | 2020-34508 A | 3/2020 |
| JP | 2021-67510 A | 4/2021 |

OTHER PUBLICATIONS

Japanese-language Written Opinion (PCT/ISA/237) issued in PCT Application No. PCT/JP2021/032927 dated Oct. 12, 2021 (four (4) pages).

\* cited by examiner

PHYSICAL QUANTITY DETECTION DEVICE

TECHNICAL FIELD

The present invention relates to a physical quantity detection device configured to detect a physical quantity of, for example, intake air in an internal combustion engine.

BACKGROUND ART

PTL 1 discloses a structure of an air flow rate measurement device including therein a bypass flow path that takes in a part of air flowing through a main flow path in a duct, a sub-bypass flow path that branches from the bypass flow path and takes in a part of air flowing through the bypass flow path, and a sensor installed in the sub-bypass flow path. The sensor includes a diaphragm to detect a flow rate, and the diaphragm includes an element front surface exposed to the sub-bypass flow path and an element rear surface exposed to a closed chamber that communicates with a circuit chamber through a ventilation hole.

CITATION LIST

Patent Literature

PTL 1: JP 2020-34508 A

SUMMARY OF INVENTION

Technical Problem

A physical quantity detection device is required to accurately measure a flow rate signal even when mounted on various types of internal combustion engines. It has been found that, in the internal combustion engine, a turbocharger mounted downstream of the physical quantity detection device generates sound pressure, causing an influence on flow rate characteristics of the physical quantity detection device. The turbocharger induces a resonance phenomenon of the sound pressure on the element front surface and the element rear surface of the diaphragm, causing the influence on the flow rate characteristics and eventually an error in detection of the flow rate. With the conventional configuration described above, in other words, with the configuration including a communication passage only between the sub-passage or a main passage and the ventilation hole of the physical quantity detection device, the sound pressure may cause the error in detection of the flow rate.

The present invention has been made in view of the above points, and an object of the present invention is to provide a physical quantity detection device configured to reduce the influence of the resonance phenomenon of the sound pressure on the flow rate characteristics.

Solution to Problem

In order to achieve the object, the present invention provides a physical quantity detection device configured to detect a physical quantity of a measurement target gas flowing in a main passage, the physical quantity detection device including:
a housing arranged in the main passage;
a sub-passage arranged in the housing;
a flow rate detection unit arranged in the sub-passage;
a circuit unit electrically connected to the flow rate detection unit;
a circuit chamber arranged in the housing and accommodating the circuit unit; and
a first pressure introduction passage including one end open to the sub-passage and the other end open to the circuit chamber to communicate between the sub-passage and the circuit chamber, and configured to introduce pressure of the measurement target gas from the sub-passage to the circuit chamber.

The flow rate detection unit includes: a diaphragm including a diaphragm front surface exposed to the sub-passage and a diaphragm rear surface exposed to a closed chamber segregated from the sub-passage; and a second pressure introduction passage including one end open to the circuit chamber and the other end open to the closed chamber to communicate between the circuit chamber and the closed chamber, and configured to introduce the pressure of the measurement target gas from the circuit chamber to the closed chamber, and
the circuit chamber includes at least one or more protrusions disposed opposite an opening to which the other end of the first pressure introduction passage is open.

Advantageous Effects of Invention

The present invention provides a physical quantity detection device configured to reduce an influence of a resonance phenomenon of sound pressure on flow rate characteristics.

Other features of the present invention will be clear from descriptions herein and the appended drawings. Problems, configurations, and effects in addition to those described above will be clarified below in descriptions of embodiments.

DESCRIPTION OF EMBODIMENTS

A mode for carrying out the present invention (hereinafter, referred to as an embodiment) described below solves various problems as an actual product, particularly solves various problems in use as a detection device configured to detect a physical quantity of intake air of a vehicle, and exhibits various effects. One of the various problems solved by the following embodiments has been described above in the technical problem that the present invention is to solve, and one of the various effects achieved by the following embodiments has been described above in the advantageous effects of the present invention. Various problems that the following embodiments are to solve and various effects that the following embodiments are to achieve will be clarified in descriptions of the following embodiments. Therefore, the problems and effects described below (as the problems and effects that the following embodiments are to solve and achieve) also include other contents in addition to those described above in the technical problem as well as the advantageous effects of the present invention.

In the following embodiments, the same reference signs indicate the same configuration even in different FIGS, and the same functions and effects are thus obtained. Configurations described previously are denoted with the same reference signs and a detailed description thereof may be omitted as appropriate.

First Embodiment

Figure 1:
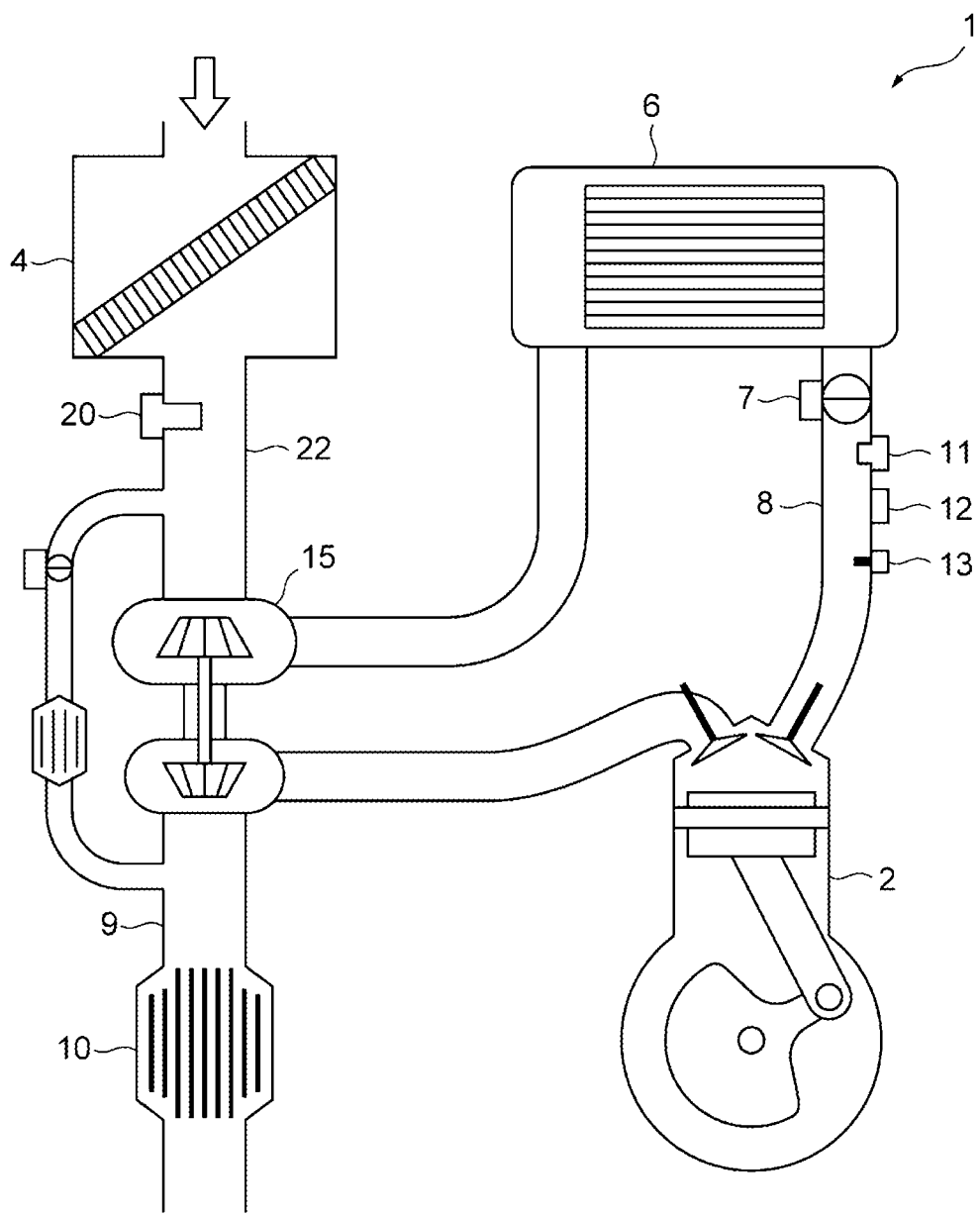
FIG. 1 is a system diagram illustrating an embodiment where a physical quantity detection device according to the present invention is used in an internal combustion engine control system.

FIG. 1 is a system diagram illustrating an embodiment where a physical quantity detection device according to the present invention is used in an internal combustion engine system 1 of an electronic fuel injection type.

The physical quantity detection device of this embodiment is used in the internal combustion engine system 1 for an automobile. The internal combustion engine system 1 includes an engine 2 together with a turbocharger 15, a main passage 22, and an exhaust passage 9. The main passage 22 includes, sequentially from upstream, an air cleaner 4, a physical quantity detection device 20, an intercooler 6, a throttle valve 7, and an intake pipe 8; and the exhaust passage 9 includes an exhaust catalyst 10. The intake pipe 8 has a thermal humidity measurement device 11, an intake pressure sensor 12, and an intake air temperature sensor 13 attached thereto, and measures humidity, pressure, and temperature of intake air taken into the engine 2.

The physical quantity detection device 20 detects each physical quantity such as a flow rate, temperature, humidity, and pressure of measurement target gas as the intake air taken in from the air cleaner 4 and flowing through the main passage 22. The physical quantity detected by the physical quantity detection device 20 is converted to an electric signal and inputted to a control device (an electronic control unit (ECU)). The control device uses the physical quantity of the intake air as an output of the physical quantity detection device 20 to calculate a fuel injection amount or ignition timing of the engine 2.

Figure 2:
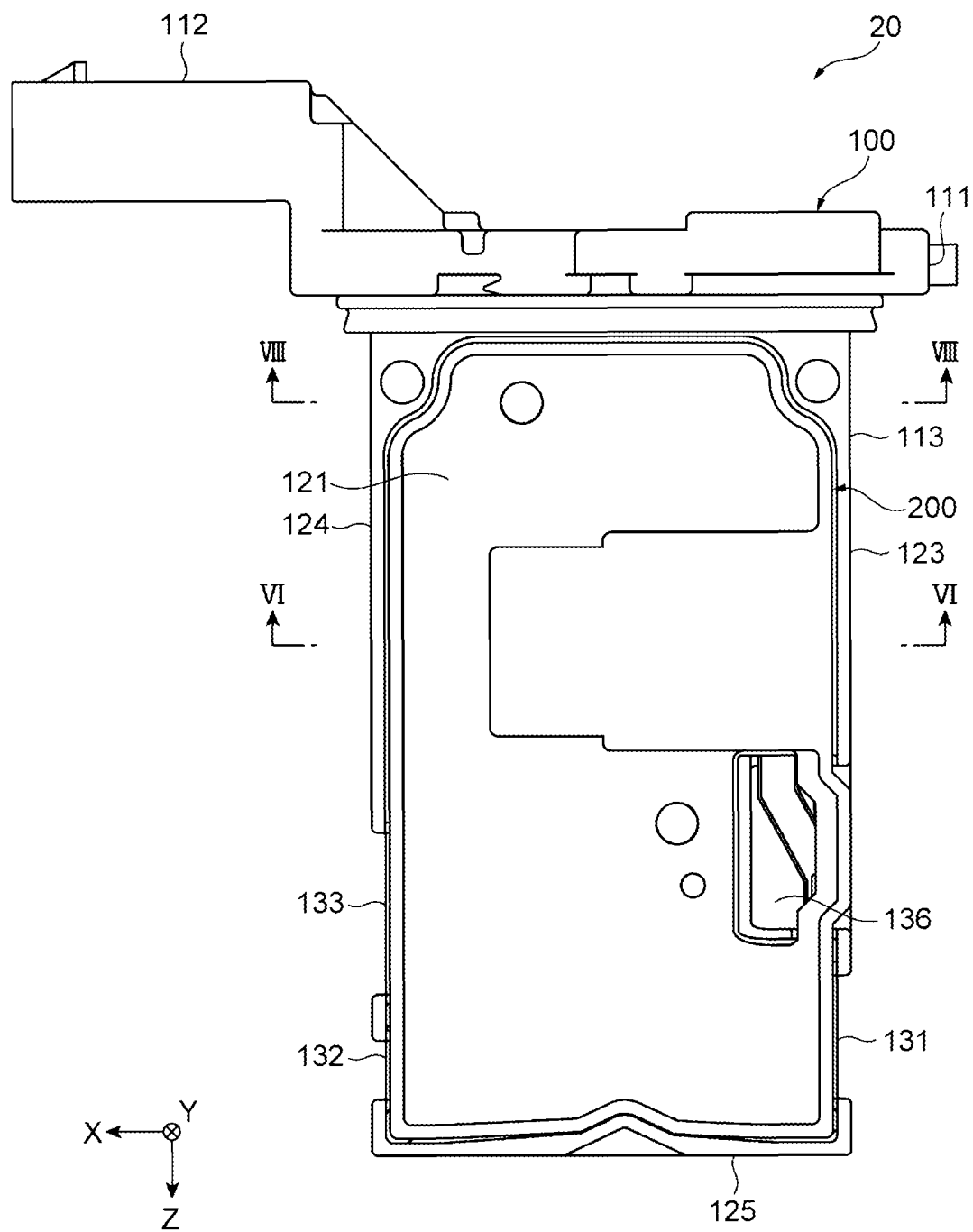
FIG. 2 is a front view of the physical quantity detection device.

FIG. 2 is a front view of the physical quantity detection device.

The physical quantity detection device 20 is used in a state of being inserted to the main passage 22 through a mounting hole disposed in a passage wall of the main passage 22 and fixed to the main passage 22. The physical quantity detection device 20 includes a housing in the main passage 22 through which the measurement target gas flows. The housing of the physical quantity detection device 20 includes a housing 100, and a cover 200 attached to the housing 100. The housing 100 is formed by, for example, injection molding a synthetic resin material. The cover 200 is formed of, for example, a plate-shaped member of a metal material or the synthetic resin material and in this embodiment, is formed of an injection-molded article of an aluminum alloy or the synthetic resin material.

The housing 100 includes a flange 111 for fixing the physical quantity detection device 20 to the main passage 22, a connector 112 protruding from the flange 111 to be exposed out of an intake body for electrical connection with an external device, and a measurement unit 113 extending from the flange 111 to protrude toward a center of the main passage 22.

The measurement unit 113 has a thin and long shape extending straight from the flange 111, and includes a front surface 121 and a rear surface 122, each as a wide surface, together with a side surface 123 and a side surface 124 as a pair of narrow side surfaces. With the physical quantity detection device 20 attached to the main passage 22, the measurement unit 113 protrudes from an inner wall of the main passage 22 toward the center of the main passage 22. The front surface 121 and the rear surface 122 are arranged in parallel along a central axis of the main passage 22. The narrow side surfaces 123 and 124 of the measurement unit 113 as the pair of narrow side surfaces are arranged opposite each other. Here, the side surface 123 at one side in a longitudinal direction of the measurement unit 113 is arranged upstream in the main passage 22, and the side surface 124 at the other side in a lateral direction of the measurement unit 113 is arranged downstream in the main passage 22. With the physical quantity detection device 20 attached to the main passage 22, the measurement unit 113 includes, as its distal end, a lower surface 125.

In the measurement unit 113, the side surface 123 has a sub-passage inlet 131, and the side surface 124 has a first outlet 132 and a second outlet 133. The sub-passage inlet 131, the first outlet 132, and the second outlet 133 are disposed near the distal end of the measurement unit 113 extending from the flange 111 toward the center of the main passage 22. The physical quantity detection device 20 includes the measurement unit 113 extending orthogonally to a center line of the main passage 22, but each of the side surfaces 123 and 124 has a narrow width. With this configuration, the physical quantity detection device 20 keeps fluid resistance to the measurement target gas at a smaller value.

Figure 3:
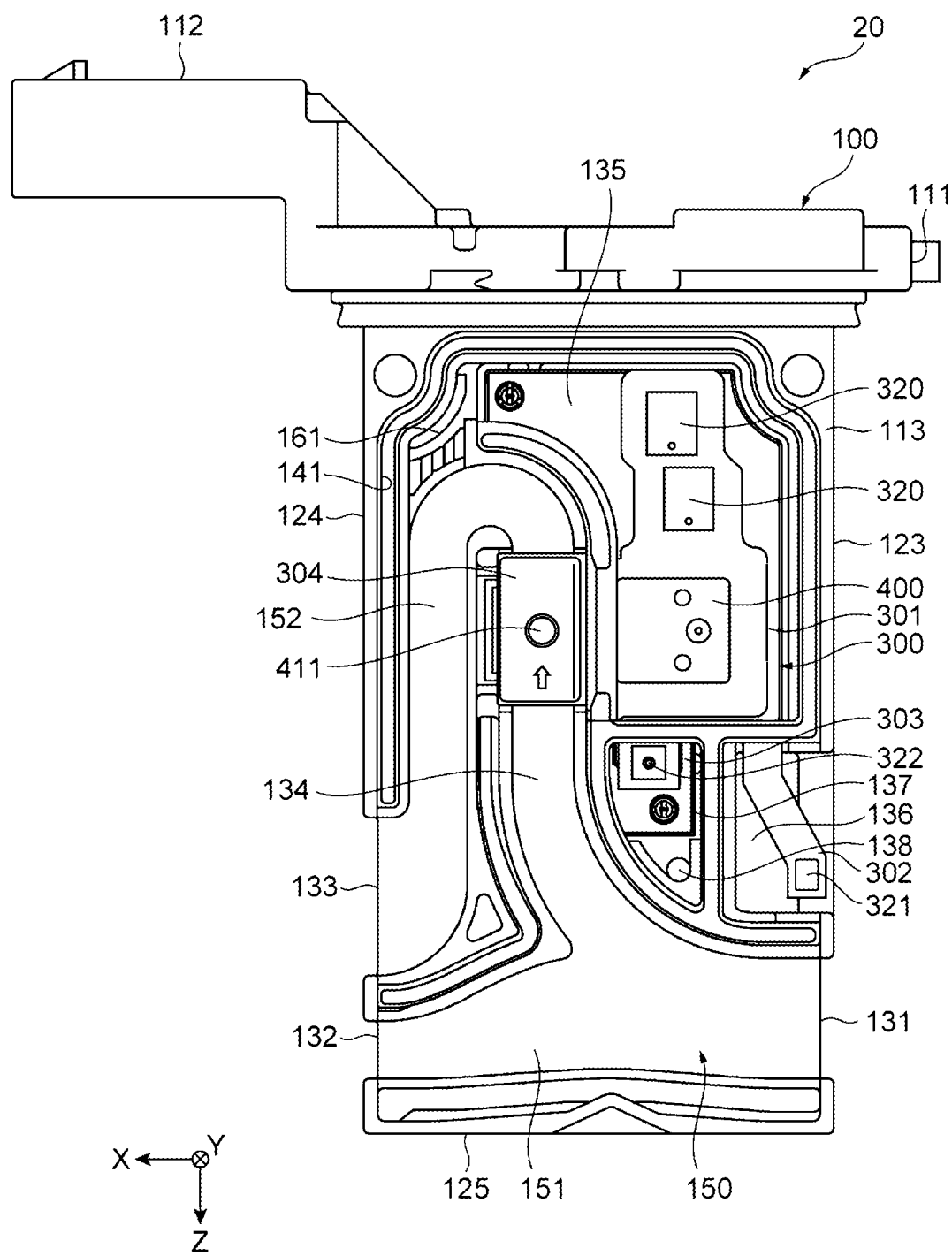
FIG. 3 is a view illustrating a state where a cover is removed from a housing of the physical quantity detection device.
Figure 4:
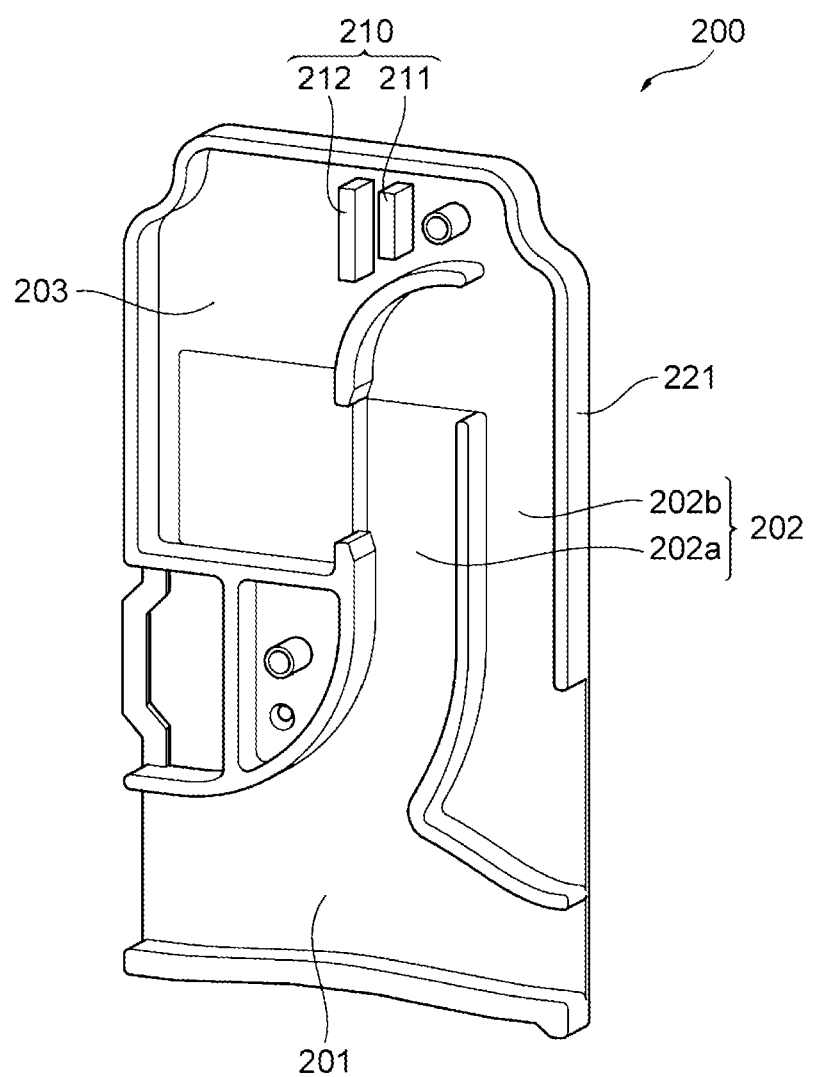
FIG. 4 is a perspective view illustrating a rear surface of the cover.
Figure 5:
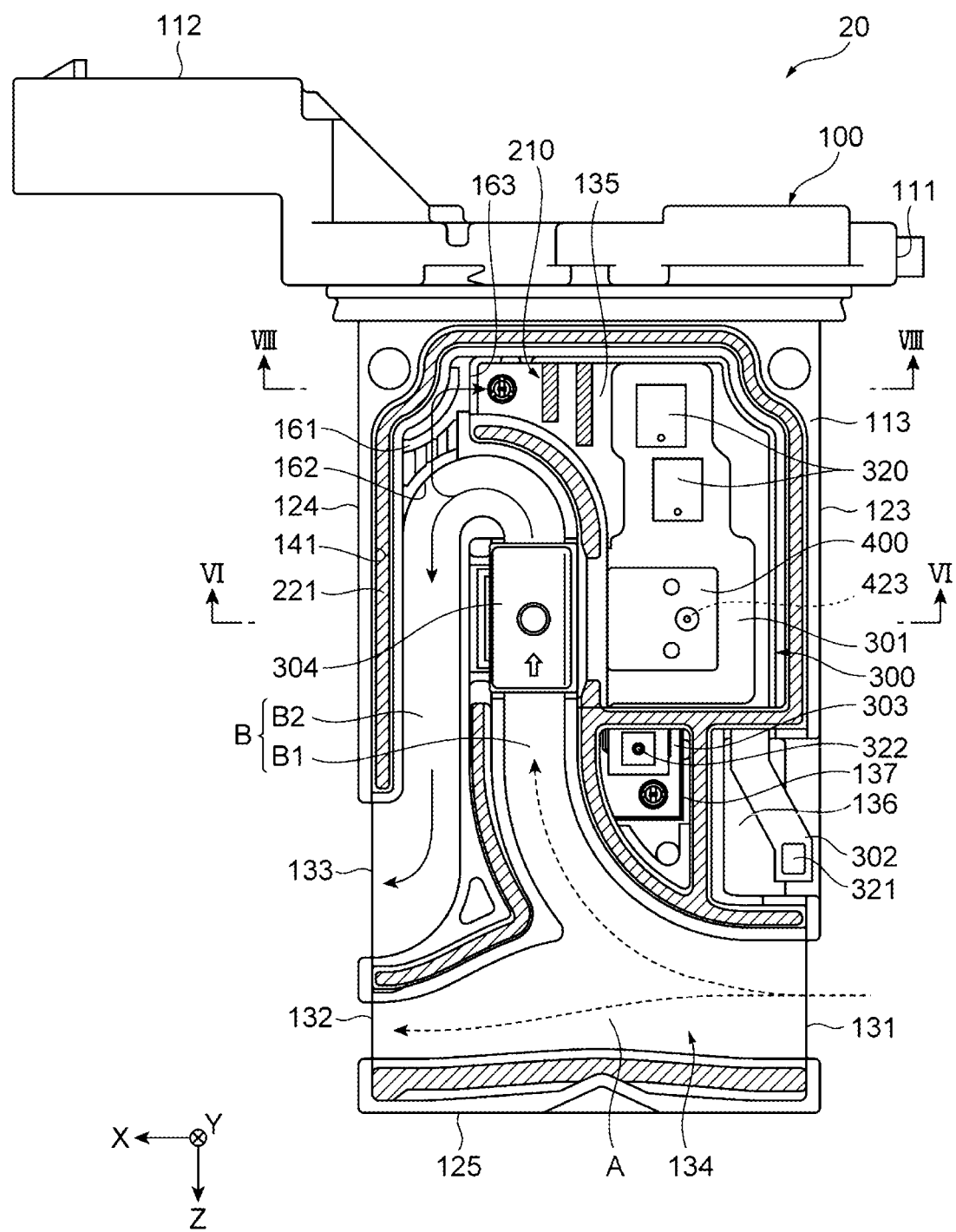
FIG. 5 is a cross-sectional view of the cover and the housing in FIG. 2, taken along a plane perpendicular to a joint surface of the cover and the housing.

FIG. 3 is a view illustrating a state where the cover is removed from the housing of the physical quantity detection device; FIG. 4 is a rear view of the cover; and FIG. 5 is a cross-sectional view of the cover and the housing in FIG. 2, taken along a plane perpendicular to a joint surface of the cover and the housing. Note that, in descriptions below, the longitudinal direction of the measurement unit 113, in which the measurement unit 113 extends from the flange 111, may be referred to as a Z-axis; the lateral direction of the measurement unit 113, in which the measurement unit 113 extends from the sub-passage inlet 131 toward the first outlet 132, may be referred to as an X-axis; and a thickness direction of the measurement unit 113, in which the measurement unit 113 extends from the front surface 121 toward the rear surface 122, may be referred to as a Y-axis.

The measurement unit 113 of the housing 100 accommodates a flow rate sensor 411 as a flow rate detection element, an intake air temperature sensor 321, and a humidity sensor 322. The flow rate sensor 411 is arranged in a middle of a sub-passage 134. The flow rate sensor 411 detects the flow rate of the measurement target gas flowing through the main passage. The intake air temperature sensor 321 is arranged in a middle of a temperature detection passage 136 that includes one end open near the sub-passage inlet 131 on the side surface 123 and the other end open to both the front surface 121 and the rear surface 122 of the measurement unit 113. The intake air temperature sensor 321 detects the temperature of the measurement target gas flowing through the main passage. The humidity sensor 322 is arranged in a humidity measurement chamber 137 of the measurement unit 113. The humidity sensor 322 measures the humidity of the measurement target gas taken into the humidity measurement chamber 137 through a window 138 that is open to the rear surface of the measurement unit 113.

The measurement unit 113 accommodates the sub-passage 134, and a circuit chamber 135 for accommodating a circuit board 300. The circuit chamber 135 and the sub-passage 134 are covered and closed in by the cover 200 attached to the front surface 121 of the measurement unit 113.

The cover 200 has a flat plate shape to cover the front surface 121 of the measurement unit 113. As illustrated in FIG. 4, the cover 200 includes, on its rear surface, a rib 221. The rib 221 is formed along a bonded portion of the cover 200 with the measurement unit 113. As illustrated in FIG. 5, the measurement unit 113 includes a recessed groove 141 on the front surface 121, and the rib 221 is to be inserted to the recessed groove 141. With the rib 221 inserted to the recessed groove 141 of the measurement unit 113, the cover 200 is bonded with an adhesive to the measurement unit 113.

The circuit chamber 135 is disposed at one side (closer to the side surface 123) in the X-axis direction, in other words, disposed upstream in a flow direction of the measurement target gas in the main passage 22. The sub-passage 134 is arranged over a region closer to the distal end (closer to the lower surface 125) in the Z-axis direction of the measurement unit 113 with respect to the circuit chamber 135, and over a region closer to the other side in the X-axis direction (closer to the side surface 124), in other words, arranged downstream in the flow direction of the measurement target gas in the main passage 22 with respect to the circuit chamber 135.

The sub-passage 134 includes a first sub-passage A and a second sub-passage B branching in a middle of the first sub-passage A. The first sub-passage A extends along the X-axis direction of the measurement unit 113, between the sub-passage inlet 131 open to the side surface 123 at the one side of the measurement unit 113 and the first outlet 132 open to the side surface 124 at the other side of the measurement unit 113. The first sub-passage A includes a flow path extending along the flow direction of the measurement target gas in the main passage 22 from the sub-passage inlet 131 to the first outlet 132. The first sub-passage A takes in the measurement target gas flowing through the main passage 22 through the sub-passage inlet 131, and then returns the measurement target gas through the first outlet 132 to the main passage 22. The first sub-passage A is formed when a first sub-passage groove recessed in the front surface of the measurement unit 113 has been covered by a region 201 of the cover 200.

The second sub-passage B branches off in the middle of the first sub-passage A, is bent toward a proximal end (the flange) of the measurement unit 113, and extends along the Z-axis direction of the measurement unit 113. Then, the second sub-passage B is bent at the proximal end of the measurement unit 113 toward the other side (side surface 124) of the measurement unit 113 in the X-axis direction of the measurement unit 113, turns back toward the distal end of the measurement unit 113, and extends again along the Z-axis direction of the measurement unit 113. The second sub-passage B is bent before the first outlet 132 toward the other side (side surface 124) of the measurement unit 113 in the X-axis direction, and is continuous to the second outlet 133 open to the side surface 124 of the measurement unit 113. The second outlet 133 is arranged opposite the main passage toward downstream in the flow direction of the measurement target gas in the main passage 22. The second outlet 133 has an opening area substantially equal to or slightly greater than that of the first outlet 132, and is arranged closer to the proximal end in the longitudinal direction of the measurement unit 113 with respect to the first outlet 132.

The second sub-passage B includes a flow path that reciprocates along the Z-axis direction of the measurement unit 113. The second sub-passage B includes a forward passage portion B1 branching off in the middle of the first sub-passage A and extending toward the proximal end of the measurement unit 113 (in a direction away from the first sub-passage A), and a return passage portion B2 extending from a proximity of the proximal end of the measurement unit 113 (an end of a separation passage portion), at which the second sub-passage B turns back, toward the distal end of the measurement unit 113 (in a direction approaching the first sub-passage A). The return passage portion B2 includes a flow path connected to the second outlet 133 that is positioned downstream in the flow direction of the measurement target gas in the main passage 22 with respect to the sub-passage inlet 131 and is open toward downstream in the flow direction of the measurement target gas. The second sub-passage B allows the measurement target gas, which has been branched from the first sub-passage A to flow therein, to pass therethrough to the second outlet 133 and then return to the main passage 22. The second sub-passage B is formed when a second sub-passage groove 152 recessed in the front surface of the measurement unit 113 has been covered by a region 202 of the cover 200.

In a middle of the second sub-passage B, a first introduction passage 161 is disposed to introduce the pressure of the measurement target gas from the second sub-passage B to the circuit chamber 135. The first introduction passage 161 includes one end open to the second sub-passage B and the other end open to the circuit chamber 135, and communicates between the second sub-passage B and the circuit chamber 135. The first introduction passage 161 includes an introduction port 162 open to the second sub-passage B. The introduction port 162 is positioned offset outward from a side wall of the second sub-passage B.

The introduction port 162 of the second sub-passage B is arranged at a folded portion where the second sub-passage B is folded back from the forward passage portion B1 to the return passage portion B2, specifically at a bent portion on an outer peripheral side surface curved in a semicircular arc shape, the bent portion closer to the return passage portion B2 with respect to a top of the folded portion. The first introduction passage 161 extends along the Z-axis direction of the measurement unit 113 from the introduction port 162 toward the proximal end of the measurement unit 113, is bent in a substantially L-shape toward the side surface 123 of the measurement unit 113 to extend along the X-axis direction, and continues to an opening 163 that is open to the circuit chamber 135.

In the middle of the forward passage portion B1 of the second sub-passage B, the flow rate sensor (a flow rate detection unit) 411 is arranged. The introduction port 162 is positioned downstream in the flow direction of the measurement target gas in the second sub-passage B with respect to the flow rate sensor 411. The flow rate sensor 411 is disposed in a sensor assembly 400, and the sensor assembly 400 is mounted on the circuit board 300.

On a front mounting surface of the circuit board 300, circuit components, e.g., the sensor assembly 400, a pressure sensor 320, the intake air temperature sensor 321, and the humidity sensor 322, are mounted; and on a rear mounting surface, circuit components, e.g., a chip resistor and a chip capacitor (not illustrated), are mounted. The circuit board 300 is arranged inside the measurement unit 113, extending longitudinally from the proximal end toward the distal end of the measurement unit 113, and extending laterally from the side surface 123 toward the side surface 124 of the measurement unit 113.

The circuit board 300 includes a main body 301 in the circuit chamber 135, together with a first protrusion 302 in the temperature detection passage 136, a second protrusion 303 in the humidity measurement chamber 137, and a third protrusion 304 in the forward passage portion B1 of the second sub-passage B; and the first protrusion 302, the second protrusion 303, and the third protrusion 304 extend from the main body 301 at the same surface height as each other. The first protrusion 302 has, at its distal end, the intake air temperature sensor 321 mounted, and the second protrusion 303 has the humidity sensor 322 mounted thereon. The third protrusion 304 is arranged opposite the sensor assembly 400 in the forward passage portion B1 of the second sub-passage B. The third protrusion 304 of the circuit board 300 closes an open portion of a recessed groove 404 of the sensor assembly 400 to form a first passage portion D1. Also, between the third protrusion 304 of the circuit board 300 and a bottom wall surface 152a of the second sub-passage groove 152, a second passage portion D2 is formed.

The sensor assembly 400 includes a supporter 401; and the supporter 401 has its proximal end fixed to the circuit board 300 in the circuit chamber 135, and has its distal end protruding into the second sub-passage groove 152. The flow rate sensor 411 is disposed on the distal end of the supporter 401. The flow rate sensor 411 is supported by the sensor assembly 400 to be exposed to the forward passage portion B1 of the second sub-passage B. The flow rate sensor 411 is arranged opposite the circuit board 300 protruding from the circuit chamber 135, at a constant distance from the circuit board 300, and measures the flow rate of the measurement target gas passing through the second sub-passage B.

Figure 6:
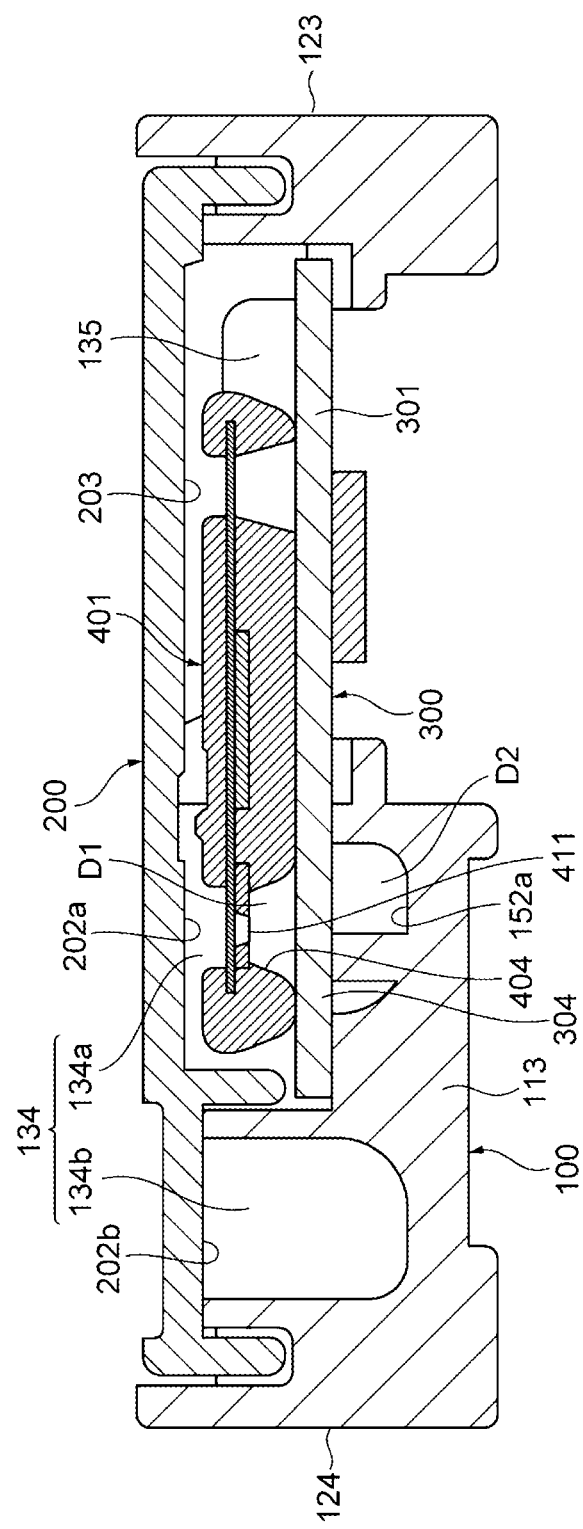
FIG. 6 is a cross-sectional view taken along line VI-VI in FIG. 5.
Figure 7:
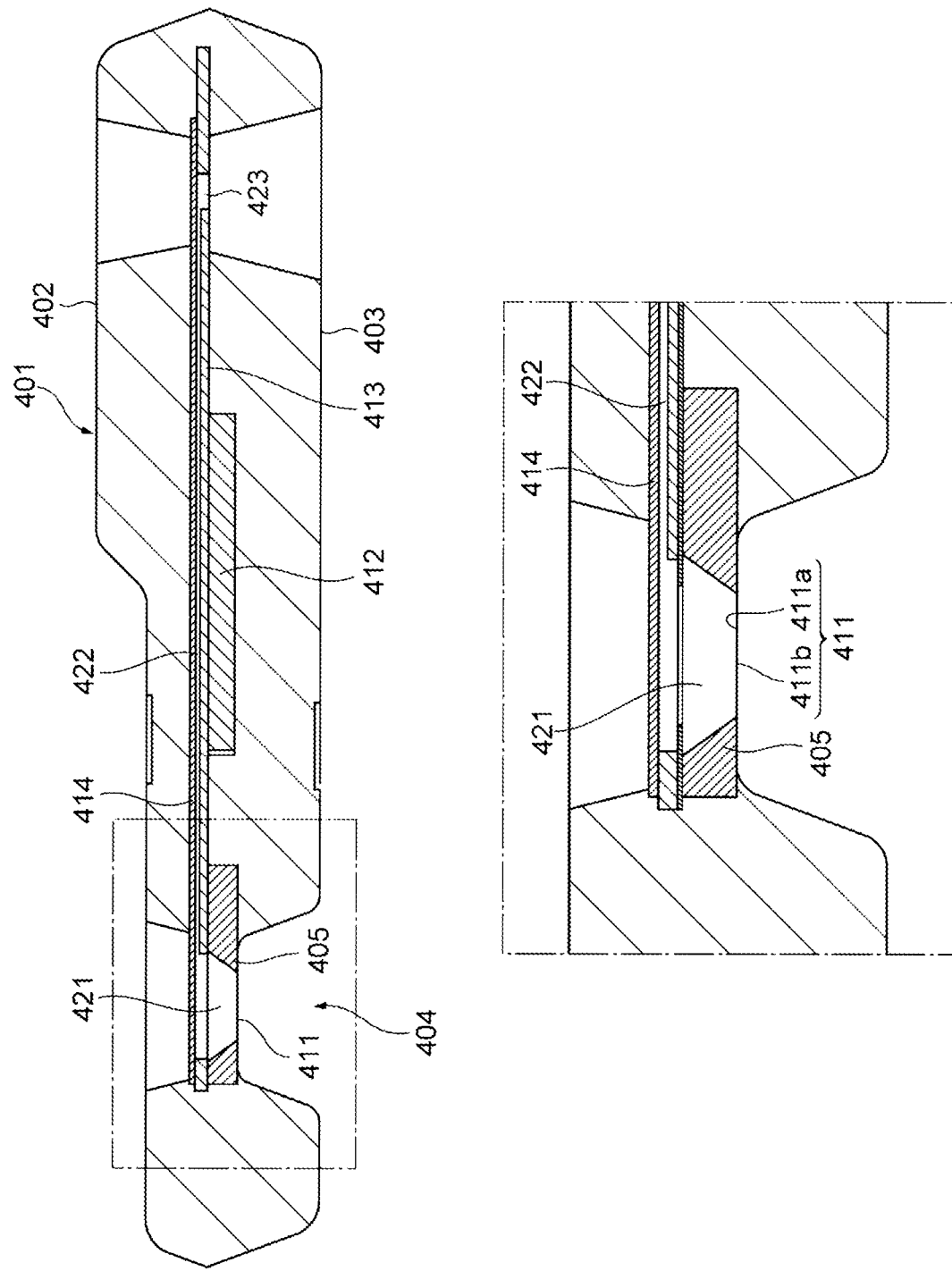
FIG. 7 is a cross-sectional view of a chip package.

FIG. 7 is an enlarged view of the sensor assembly 400 in FIG. 6.

The sensor assembly 400 is a resin package where the flow rate sensor 411, an LSI 412, and a lead frame 413 are molded with resin. The flow rate sensor 411 and the LSI 412 are mounted on one surface of the lead frame 413. The sensor assembly 400 is formed when the flow rate sensor 411 has been sealed with resin such that a diaphragm of the flow rate sensor 411 is exposed.

The sensor assembly 400 includes the supporter 401 molded with resin and having a flat plate shape with a predetermined thickness. In the sensor assembly 400, the supporter 401 includes a proximal end 401A arranged in the circuit chamber 135, and includes a distal end 401B of the supporter 401 protruding into the second sub-passage groove 152. The sensor assembly 400 is electrically connected and mechanically fixed to the circuit board 300 with a fixing portion.

The recessed groove 404 is positioned at the distal end of the supporter 401. At the distal end of the supporter 401, the recessed groove 404 extends along a width direction of the distal end of the supporter 401, and the flow rate sensor 411 is arranged to be exposed at an intermediate position in the direction where the recessed groove 404 extends. The flow rate sensor 411 includes a sensor element 405 having a diaphragm structure. The sensor element 405 of the flow rate sensor 411 includes the diaphragm, having a diaphragm front surface 411a exposed to the forward passage portion B1 of the second sub-passage B and having a diaphragm rear surface 411b exposed to a closed chamber 421 segregated from the sub-passage 134.

On the diaphragm front surface 411a, a heater is arranged, and a pair of electric resistors are positioned away from each other with the heater interposed therebetween. The flow rate sensor 411 has air passing through the diaphragm front surface 411a and heated by the heater. Here, in accordance with the flow of the air, heat distribution changes; and in accordance with the change in the heat distribution, electric resistance changes. Based on the change in the electric resistance, the flow rate sensor 411 measures the flow rate of the measurement target gas.

The closed chamber 421 is disposed in the sensor element 405 of the flow rate sensor 411. The sensor element 405 is mounted on the one surface of the lead frame 413; and the closed chamber 421 is closed by a polyimide tape 414 attached to the other surface of the lead frame 413, and includes a closed space segregated from the outside environment.

The sensor assembly 400 has a ventilation passage 422 that includes one end open to the circuit chamber 135 and the other end open to the closed chamber 421 to communicate between the circuit chamber 135 and the closed chamber 421. On the other surface of the lead frame 413, a recessed groove continuously extends between an opening hole 423 and the closed chamber 421. On the other surface of the lead frame 413, the polyimide tape 414 of a sheet shape is attached to seal an open portion of the recessed groove, and the ventilation passage 422 includes one end open to the closed chamber 421 and the other end continuous to the opening hole 423. The ventilation passage 422 communicates between the closed chamber 421, to which the diaphragm rear surface 411b is exposed, and the circuit chamber 135. The ventilation passage 422 corresponds to a second introduction passage configured to introduce the pressure of the measurement target gas from the circuit chamber 135 to the closed chamber 421.

Figure 8:
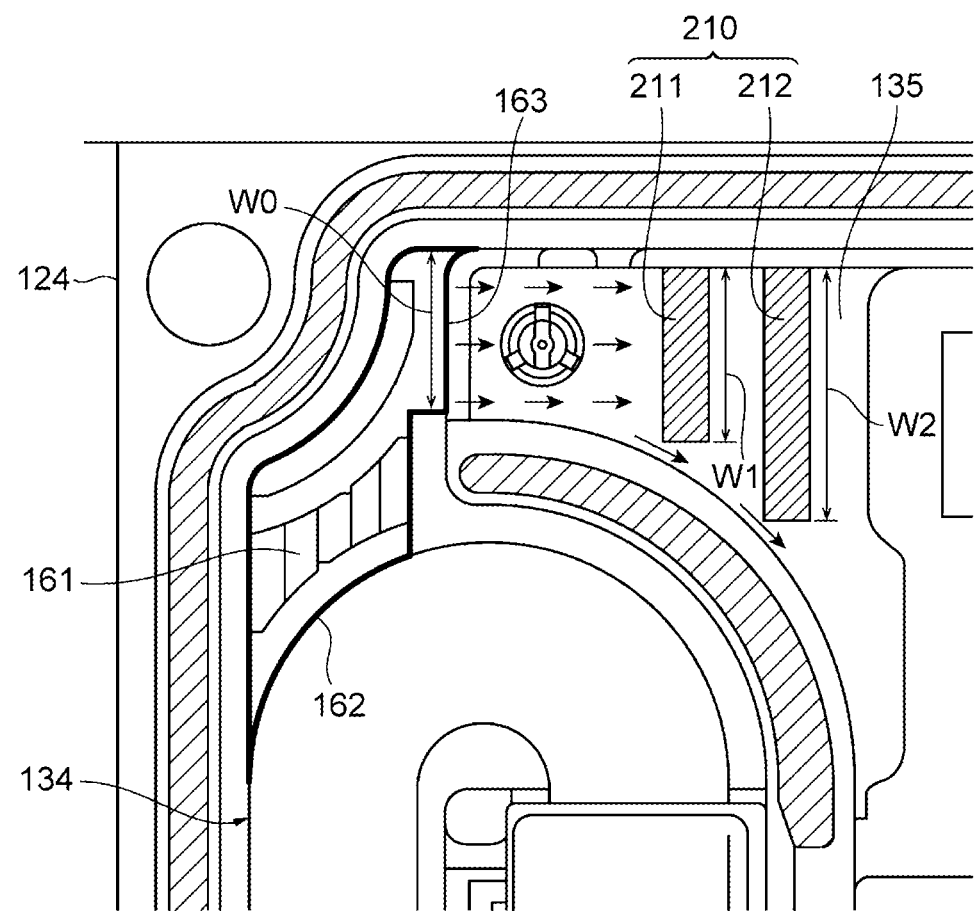
FIG. 8 is an enlarged view of a main part in FIG. 5.
Figure 9:
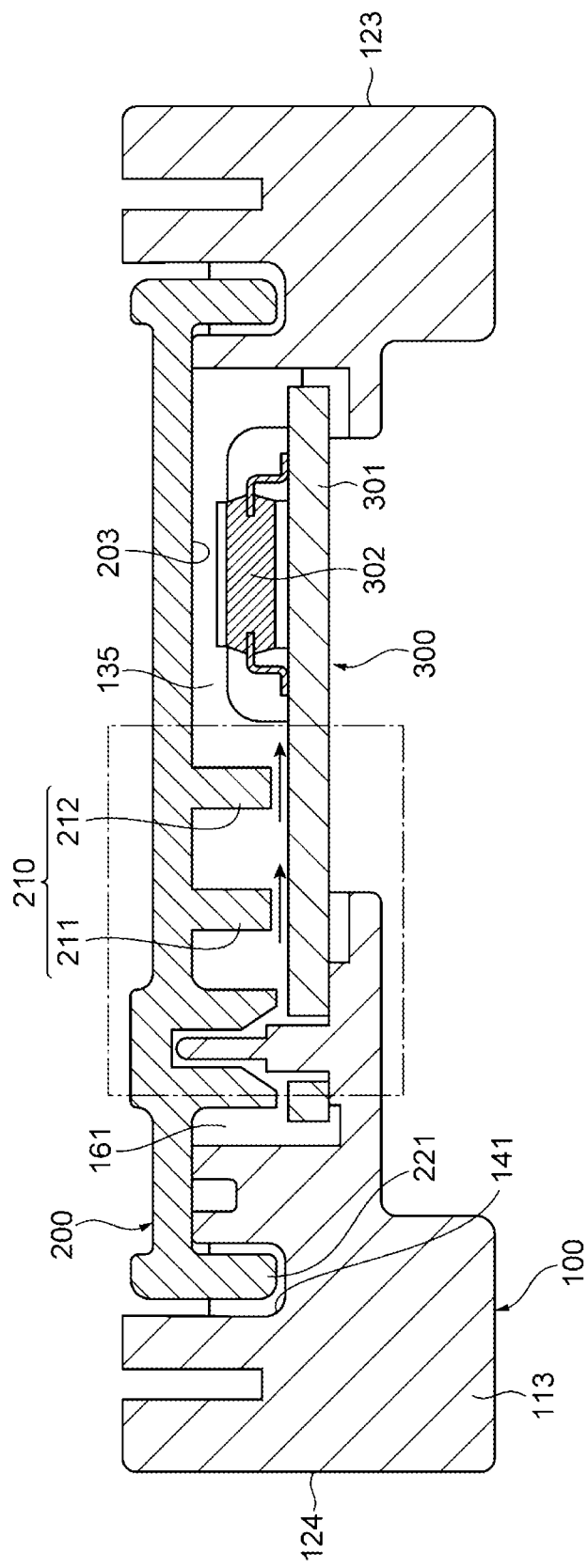
FIG. 9 is a cross-sectional view taken along line VIII-VIII in FIG. 5.
Figure 10:
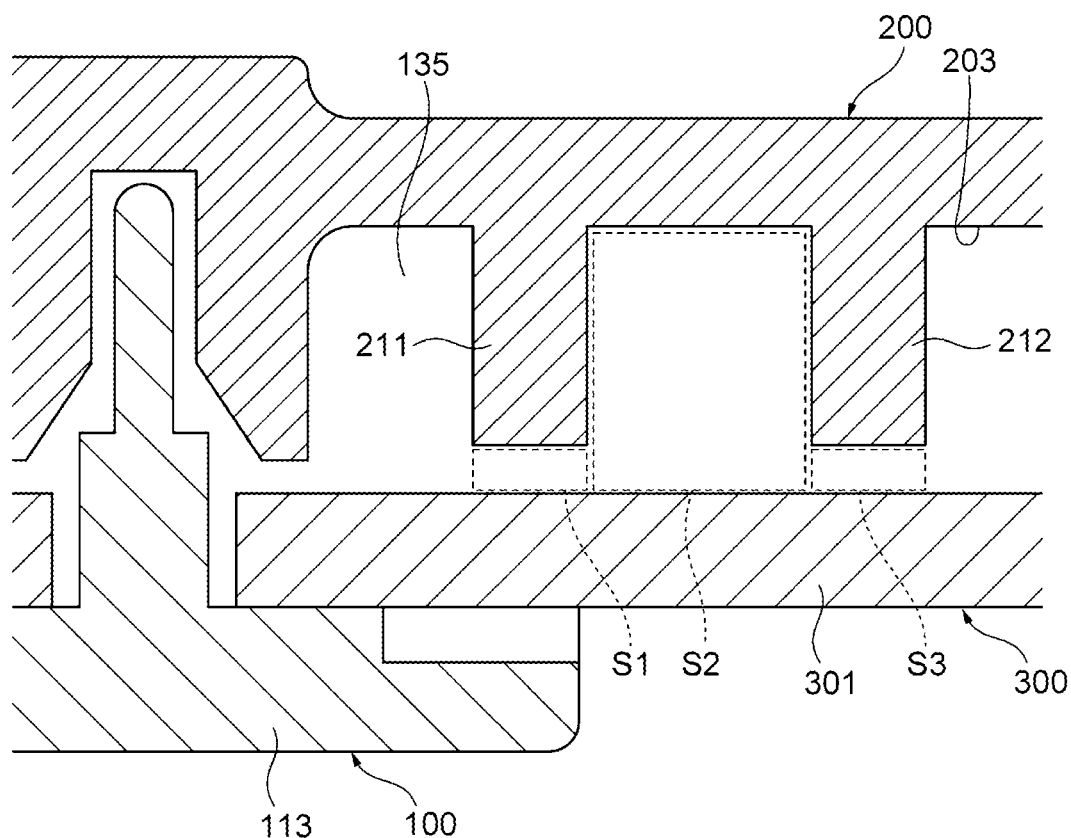
FIG. 10 is an enlarged view of a main part in FIG. 9.

FIG. 8 is an enlarged view of a main part of FIG. 5, FIG. 9 is a cross-sectional view taken along line VIII-VIII of FIG. 5, and FIG. 10 is an enlarged view of a main part of FIG. 9.

The circuit chamber 135 includes at least one or more protrusions 210 positioned opposite the opening 163 of the first introduction passage 161. The one or more protrusions 210 include a plurality of protrusions and recesses. The one or more protrusions 210 are formed integrally with the cover 200. The one or more protrusions 210 are arranged at a predetermined distance from a side wall of the circuit chamber 135 and from the circuit board 300, so that the measurement target gas passes through the first introduction passage 161 to flow between the second sub-passage B and the circuit chamber 135.

As illustrated in, for example, FIGS. 4 and 9, the one or more protrusions 210 include a first protrusion 211 and a second protrusion 212. The first protrusion 211 is positioned opposite the opening 163 of the first introduction passage 161 in the circuit chamber 135; and the second protrusion 212 is positioned away from the opening 163 of the first introduction passage 161, with the first protrusion 211 interposed between the second protrusion 212 and the opening 163. The first protrusion 211 is formed in a rectangular parallelepiped shape having a length W1 substantially equal to an opening width W0 of the opening 163, and is arranged opposite the opening 163 and over the opening width W0 of the opening 163. The second protrusion 212 is formed in the rectangular parallelepiped shape having a length W2 greater than the opening width W0 of the opening 163, and is aligned parallel to the first protrusion 211.

As illustrated in FIG. 10, the one or more protrusions 210 have a space S1 formed between a distal end of the first protrusion 211 and the main body 301 of the circuit board 300, a space S2 formed between the first protrusion 211 and the second protrusion 212, and a space S3 formed between a distal end of the second protrusion 212 and the main body 301 of the circuit board 300. The space S1 is closer to the opening 163 of the first introduction passage 161 with respect to the space S2 and is narrower (has a smaller cross-sectional area) than the space S2; and the space S2 is farther to the opening 163 of the first introduction passage 161 with respect to the space S1 and is wider (has a greater cross-sectional area) than the space S1 (S1<S2). With regard to the space S2 and the space S3, the space S3 is narrower than the space S2.

Figure 11A:
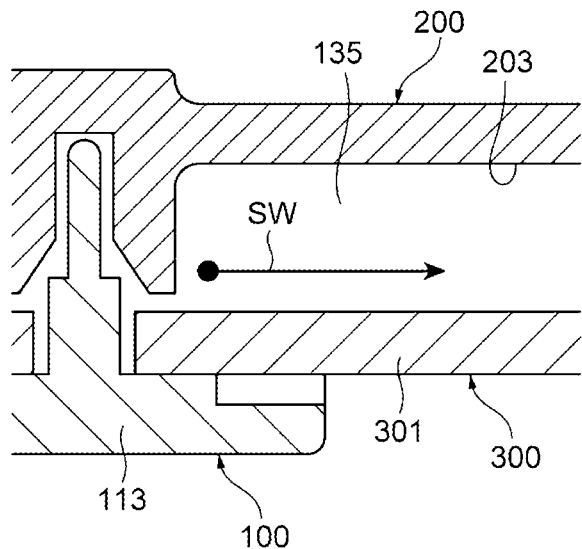
FIGS. 11A to 11C are diagrams for describing a difference between the physical quantity detection device according to the present invention and a physical quantity detection device according to a comparative example.
Figure 11B:
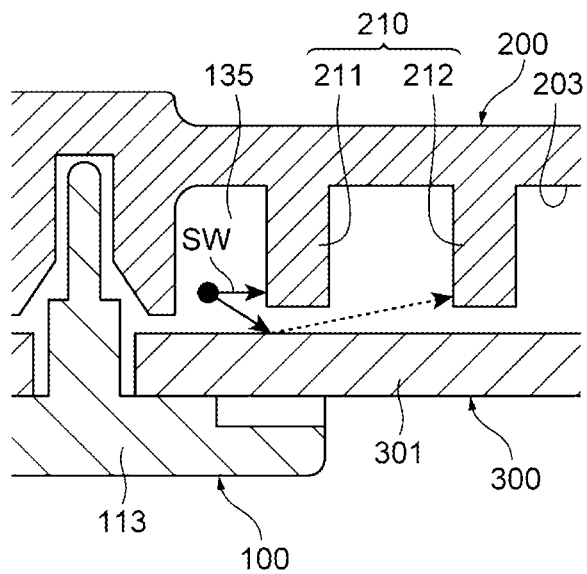
Figure 11C:
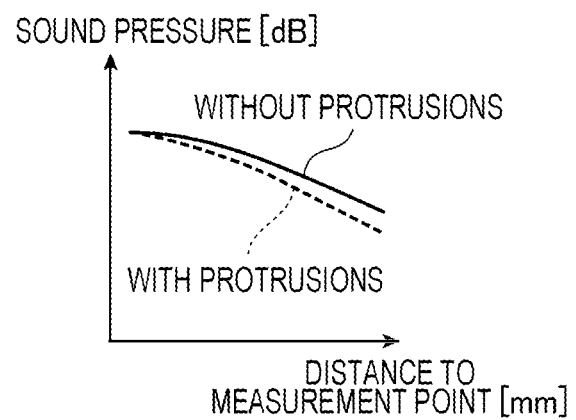

FIGS. 11A to 11C are diagrams for describing a difference between the physical quantity detection device of the present invention and a physical quantity detection device of a comparative example. FIG. 11A illustrates a structure in the comparative example where the one or more protrusions 210 are not included; FIG. 11B illustrates a structure in the present invention where the one or more protrusions 210 are included; and FIG. 11C is a graph for describing a relationship between the sound pressure and a distance to a measurement point in a case where these protrusions are included and a case where the protrusions are not included.

In this embodiment, the turbocharger 15 is arranged downstream of the physical quantity detection device 20, and generates a sound wave that is to pass from the second sub-passage B through the first introduction passage 161 to the circuit chamber 135.

As illustrated in FIG. 11A, in the comparative example, a sound wave SW, having entered the circuit chamber 135 through the opening 163 of the first introduction passage 161, has no obstacle and thus travels to a depth of the circuit chamber 135 with the sound pressure hardly attenuated. Then, in the sensor assembly 400, the sound wave SW passes from the opening hole 423 through the ventilation passage 422 to the closed chamber 421 to which the diaphragm rear surface is exposed. Here, resonance of the sound pressure may occur on the element front surface and the element rear surface of the diaphragm, and a thermoacoustic phenomenon may generate heat convection, causing a change in temperature distribution of the heater on the diaphragm and eventually an error in detection of the flow rate.

On the other hand, as illustrated in FIG. 11B, in the present invention, the sound wave SW, having entered the circuit chamber 135 through the opening 163 of the first introduction passage 161, is blocked by the one or more protrusions 210 and is thus unable to move straight ahead. Here, the sound pressure of the sound wave SW is diffracted and attenuated, thereby resulting in smaller. As illustrated in, for example, FIG. 11C, in the structure where the protrusions are included, the sound pressure is smaller than in the structure where the protrusions are not included.

Additionally, when the sound wave SW, having entered the circuit chamber 135 through the opening 163 of the first introduction passage 161, travels from the space S1 to the space S2 where the cross-sectional area becomes greater, fluid flowing therethrough is expanded, causing a decrease in speed and pressure of the fluid. As a result, smaller energy passes through the space S3, and the rest of the energy is reflected in the space S2 to be attenuated. The sound wave is reflected at a location where the impedance rapidly changes (rapidly increases or rapidly decreases) and thus, is reflected at an inlet between the space S2 and the space S1 and at an outlet between the space S2 and the space S3. The sound wave is reflected, thereby causing an interference of the sound wave in the spaces S1, S2, and S3. As a result, the energy of the sound wave is consumed, resulting in smaller sound pressure.

With this configuration, the sound pressure in the second sub-passage B is actively attenuated, and the sound wave is less prone to hold a high level of energy when transmitted to the closed chamber 421. Further, with this configuration, the resonance of the sound pressure is less prone to occur on the element front surface and the element rear surface of the diaphragm, thereby resulting in increased accuracy in detection of the flow rate.

Figure 12:
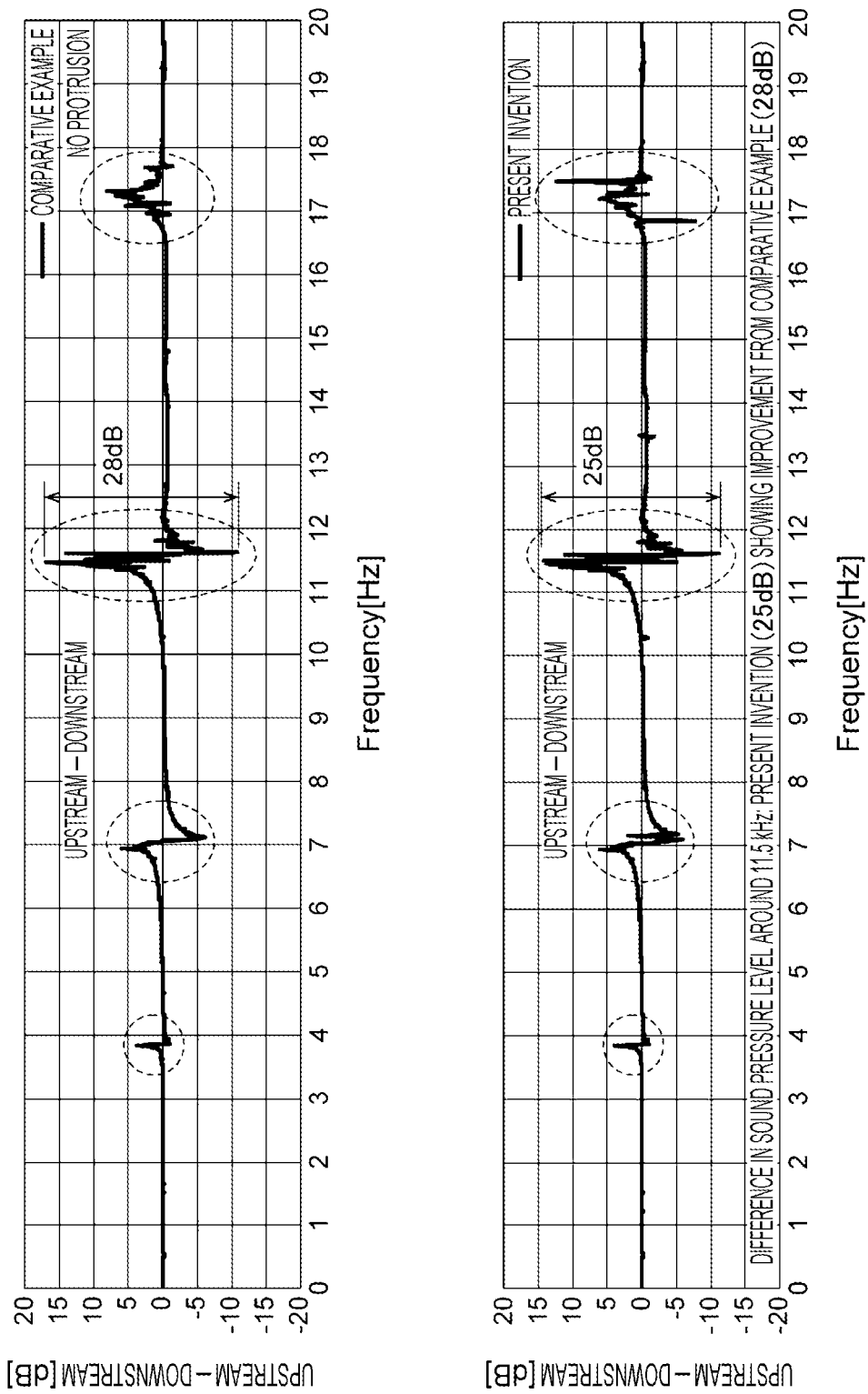
FIG. 12 is a diagram for describing a difference in results of measured sound pressure between the present invention and the comparative example.

FIG. 12 is a diagram for describing a result of sound pressure measured in each of the present invention and the comparative example.

As a difference in the sound pressure measured in a vicinity of predetermined frequency, the result exhibits the maximum sound pressure of 28 dB in the comparative example, while the result exhibits the maximum sound pressure of 25 dB in the present invention. Thus, it is understood that with the physical quantity detection device of the present invention, the sound pressure is reduced and thus improved from that of the comparative example.

Figure 13:
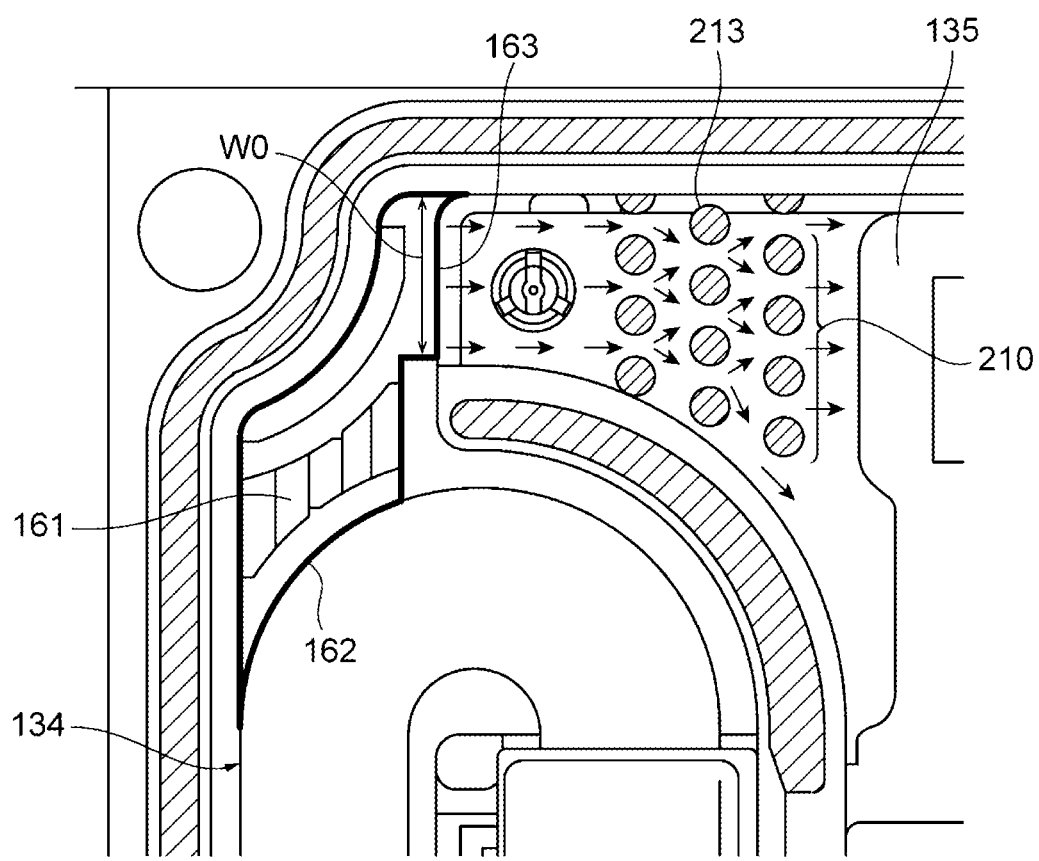
FIG. 13 is a diagram for describing a modification of a first embodiment.

FIG. 13 is a diagram illustrating a modification of this embodiment corresponding to FIG. 8.

In the modification, the one or more protrusions 210 include a plurality of third protrusions 213. Each of the plurality of third protrusions 213 has a rod shape, and is positioned opposite the opening 163 of the first introduction passage 161 in the circuit chamber 135. The plurality of third protrusions 213 are arranged over a length equal to the opening width W0 of the opening 163, and are spread in a zigzag shape at a predetermined distance from each other. The plurality of third protrusions 213 are arranged at the predetermined distance that is sufficient to block the sound wave SW having entered the circuit chamber 135 through the opening 163 of the first introduction passage 161, so that the sound wave SW is unable to move straight ahead.

In the modification, similarly to the foregoing embodiments, the sound pressure in the second sub-passage B is actively attenuated, and the sound wave is less prone to hold the high level of energy when transmitted to the closed chamber 421. Further, with this configuration, the resonance of the sound pressure is less prone to occur on the element front surface and the element rear surface of the diaphragm, thereby resulting in increased accuracy in detection of the flow rate. The number of the plurality of third protrusions 213 may be modified to adjust the attenuation of the sound pressure as desired.

With regard to the foregoing embodiments described above, the present invention is not limited thereto. Accordingly, it is easily understood that any change, addition, or deletion of a configuration of each unit appropriately made within the spirit of the present invention will naturally fall within the scope of claims of the present invention. For example, the detailed description of each of configurations in the foregoing embodiments is to be considered in all respects as merely illustrative for convenience of description, and thus is not restrictive. Additionally, a configuration of an embodiment may be partially replaced with and/or may additionally include a configuration of other embodiments. Further, any addition, removal, and replacement of other configurations may be partially made to, from, and with a configuration in each embodiment.

REFERENCE SIGNS LIST 15 turbocharger
20 physical quantity detection device
100 housing
200 cover (housing)
134 sub-passage
135 circuit chamber
161 first introduction passage
162 introduction port
163 opening
210 protrusion
211 first protrusion
212 second protrusion
213 third protrusion
300 circuit board (circuit unit)
400 sensor assembly
411 flow rate sensor (flow rate detection unit)
411a diaphragm front surface
411b diaphragm rear surface
422 ventilation passage
B second sub-passage
B1 forward passage portion
B2 return passage portion

The invention claimed is:

1. A physical quantity detection device configured to detect a physical quantity of a measurement target gas flowing in a main passage, the physical quantity detection device comprising:
a housing arranged in the main passage; a sub-passage arranged in the housing; a flow rate detection unit arranged in the sub-passage; a circuit unit electrically connected to the flow rate detection unit; a circuit chamber arranged in the housing and accommodating the circuit unit; and a first introduction passage including one end open to the sub-passage and another end open to the circuit chamber to communicate between the sub-passage and the circuit chamber, and configured to introduce pressure of the measurement target gas from the sub-passage to the circuit chamber, wherein
the flow rate detection unit includes: a diaphragm including a diaphragm front surface exposed to the sub-passage and a diaphragm rear surface exposed to a closed chamber segregated from the sub-passage; and a second introduction passage including one end open to the circuit chamber and the other end open to the closed chamber to communicate between the circuit chamber and the closed chamber, and configured to introduce the pressure of the measurement target gas from the circuit chamber to the closed chamber, and
the circuit chamber includes at least one or more protrusions arranged opposite an opening to which the other end of the first introduction passage is open.

2. The physical quantity detection device according to claim 1, wherein the at least one or more protrusions include a first protrusion arranged opposite the opening, and a second protrusion arranged away from the opening, with the first protrusion interposed between the opening and the second protrusion.

3. The physical quantity detection device according to claim 2, wherein
the first protrusion has a length equal to an opening width of the opening, and is arranged opposite the opening and over the opening width of the opening, and
the second protrusion has a length greater than the opening width of the opening, and is arranged and aligned parallel to the first protrusion.

4. The physical quantity detection device according to claim 1, wherein the at least one or more protrusions include a plurality of third protrusions, each of the third protrusions having a rod shape.

5. The physical quantity detection device according to claim 4, wherein the plurality of third protrusions are arranged over a length equal to an opening width of the opening, and are spread in a zigzag shape at a predetermined distance from each other.

6. The physical quantity detection device according to claim 1, wherein the first introduction passage includes an introduction port that is arranged offset outward from a side wall of the sub-passage.

7. The physical quantity detection device according to claim 6, wherein
the sub-passage includes a forward passage portion extending toward one side in an axial direction predetermined, and a return passage portion extending from an end of the forward passage portion, at which the sub-passage turns back, toward the other side in the axial direction, and
the introduction port is arranged at a folded portion where the sub-passage is folded back from the forward passage portion to the return passage portion.

8. The physical quantity detection device according to claim 7, wherein
the flow rate detection unit is configured to detect a flow rate of the measurement target gas and arranged in the sub-passage, and
the introduction port is arranged downstream in a flow direction of the measurement target gas in the sub-passage with respect to the flow rate detection unit.

9. The physical quantity detection device according to claim 8, wherein the flow rate detection unit is arranged in the forward passage portion of the sub-passage.

* * * * *